United States Patent [19]
Tabler

[11] Patent Number: 5,806,655
[45] Date of Patent: Sep. 15, 1998

[54] WHEELED VEHICLE GUIDANCE AND DRIVE SYSTEM

[75] Inventor: Charles P. Tabler, Cincinnati, Ohio

[73] Assignee: OCS-IntelliTrak, Inc., Cincinnati, Ohio

[21] Appl. No.: 594,088

[22] Filed: Jan. 30, 1996

[51] Int. Cl.⁶ .................................................. B65G 25/04
[52] U.S. Cl. ...................................... 198/465.3; 104/166
[58] Field of Search .............................. 198/465.1, 465.2, 198/465.3, 467.1, 803.2; 104/163, 166, 167

[56] References Cited

U.S. PATENT DOCUMENTS

| | | | |
|---|---|---|---|
| 4,363,275 | 12/1982 | Kaji | 104/166 |
| 4,567,979 | 2/1986 | Hoehn | 104/167 |
| 4,791,872 | 12/1988 | McGinn | 104/166 |
| 5,097,935 | 3/1992 | Weiss | 198/465.3 X |
| 5,388,684 | 2/1995 | Peck | 198/465.3 X |

FOREIGN PATENT DOCUMENTS

| | | | |
|---|---|---|---|
| 0055235 | 3/1987 | Japan | 104/166 |
| 0436380 | 11/1967 | Sweden | 104/166 |

*Primary Examiner*—James R. Bidwell
*Attorney, Agent, or Firm*—Fay, Sharpe, Beall, Fagan, Minnich & McKee

[57] ABSTRACT

A standard wheeled dolly frame or pallet is connected to a carriage at one or opposite sides thereof. Each carriage has an elastomeric material for biasing a plurality of pivotally mounted driven wheels against a rotatable drive shaft extending along a transporting direction. The driven wheels are canted with respect to the drive shaft so that when the drive shaft is rotated by a belt driven by an electric motor and a mechanical transmission, a helical loci of engagement between the drive shaft and driven wheels provides sufficient traction through the engagement force of the bias member to propel the wheeled vehicle along the transporting path. Preferably, the drive shaft is composed of a number of discontinuous driving sections that are aligned or alignable for diverting transporting paths so as to each be driven by a separate set of a drive motor, mechanical transmission and drive belt. The drive shaft may include curved sections so that the transporting path may take on any desired shape. The drive shaft is mounted by a plurality of bearings within a channel.

9 Claims, 1 Drawing Sheet

WHEELED VEHICLE GUIDANCE AND DRIVE SYSTEM

BACKGROUND OF THE INVENTION

The present invention relates to the guidance and driving of a wheeled vehicle along a transporting path of a support surface, particularly where the support surface is a factory floor.

It is known to provide wheeled vehicles with their own power supply for driving their own wheels, with guidance being provided passively by engagement with a guide rail or the like or actively through an on-board controller and sensors to sense, recognize and navigate throughout their environment. However, such active guidance systems and such on-board power systems are relatively expensive when compared to a simple known wheeled pallet that is manually moved about a factory floor, for example.

Various drive systems are known to propel carriages along a transporting path, but they all have their disadvantages, for example chains require high maintenance with respect to lubrication and cleaning, they are dirty with respect to the environment, and they are noisy. Others of the drive systems that are not completely on board the wheeled vehicle are either not appropriate when competing with manual wheeled pallets or they have not been adapted specifically to wheeled vehicles.

SUMMARY OF THE INVENTION

The preferred embodiment is usable with a standard wheeled dolly frame or pallet, and is adapted thereto by connecting a carriage to one or opposite sides of the wheeled vehicle, each which carriage has an elastomeric material bias member for biasing a plurality of pivotally mounted driven wheels against a rotatable drive shaft extending along the transporting direction. The driven wheels are canted with respect to the drive shaft so that when the drive shaft is rotated by a belt driven electric motor/mechanical transmission, a helical loci of engagement between the drive shaft and driven wheels provides sufficient traction through the engagement force of the bias member to propel the wheeled vehicle along the transporting path.

Preferably, the drive shaft is composed of a number of drivingly discontinuous sections that are aligned or alignable for diverting transporting paths and each being driven by a separate set of the drive motor, mechanical transmission and drive belt. The drive shaft may include curved sections so that the transporting path may take on any desired shape. The drive shaft is mounted by a plurality of bearings within a channel.

BRIEF DESCRIPTION OF THE DRAWING

Further objects, features and advantages of the present invention will become more clear from the following detailed description of a preferred embodiment, shown in the accompanying drawing, wherein.

DETAILED DESCRIPTION OF THE PREFERRED EMBODIMENT

Figure 1:
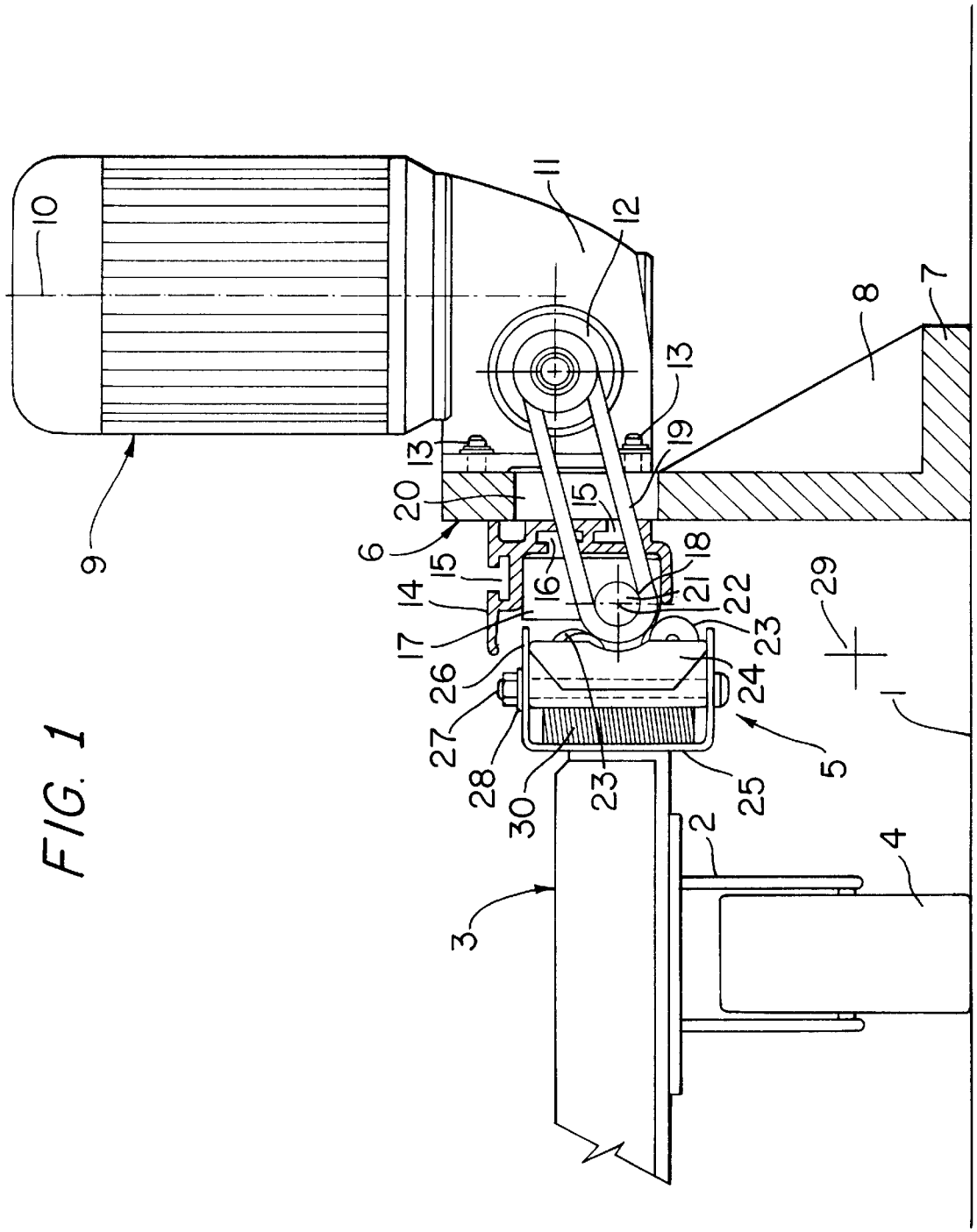
FIG. 1 is a cross-sectional view, taken on a vertical plane, of the system of the preferred embodiment.

In a conventional factory having a floor 1, a plurality of conventional wheeled vehicles 3, particularly aluminum dolly frames, are each moved about on one or more and, preferably four wheels 4, that are mounted by wheel brackets 2, so as to be movable along a transporting path 29 that is predominately horizontal, but which may also travel uphill, downhill, divert between subpaths, and the like.

The right side, in the drawing, of the wheeled vehicle 3 is provided with guidance by having mounted thereon a guide mechanism 5 to control movement of the wheeled vehicle to the right. Also, this guidance function may be provided by mirror imaging the guide mechanism 5 on the left side of the wheeled vehicle 3 to prevent movement of the wheeled vehicle towards the left away from the transporting path 29. As a further alternative, the guide mechanism 5 to the left of the wheeled vehicle 3 may include a guidance and drive system to now be described with respect to the right side of the wheeled vehicle 3 (actually, the replacement guidance and drive system for the left side of the vehicle would be a mirror image of the entire guidance and drive system shown in the drawing for the right side of the vehicle).

Extending substantially along the entire transporting path, there is a stationary frame 6, which may be attached to the factory ceiling, factory wall, or factory floor 1 as in the preferred embodiment. The frame 6, by way of example, comprises an L-shaped steel structural member 7 having a plurality of reinforcing webs 8 at spaced intervals.

A conventional drive motor 9 having a downwardly extending drive shaft (not shown) along axis 10 is mounted on a standard mechanical transmission 11. The transmission 11 has a power input drivingly coupled to the rotational power output of the drive motor, and further has a rotational power output including a belt drive pulley 12. While an electric motor 9 is provided in the preferred embodiment, the drive motor may be hydraulic, pneumatic, or like rotational type power supply, or a linear type motor according to the broader aspects of the present invention. Preferably, the mechanical transmission 11 is a worm gear speed reduction unit, but this mechanical transmission, according to the broader aspects of the invention, may consist of a single shaft coupling if gear reduction is not needed. The motor 9 is connected to the frame 7 by being securely fastened to the top of the mechanical transmission 11, which mechanical transmission is in turn directly connected by means of bolts 13 to the frame 6.

A channel 14 is bolted, for example by means of the same bolts 13, to the frame 6 on the opposite side of the frame 6 from the motor 9 and mechanical transmission 11. The channel 14 is preferably sufficiently rigid for its function, but also bendable along the transporting path that may be curved. The channel 14 comprises a plurality of aligned and identical cross-sectionally shaped extruded aluminum sections having outwardly facing keyhole shaped slots 15 to provide for mounting of the channel on vertical and horizontal surfaces, as well as inwardly facing keyhole shape slots 16 for the mounting of a plurality of bearing blocks 17 at spaced locations along the transporting path. The bearing blocks 17, in the cross-sectional view of FIG. 1, do not in any way encumber or overlap the leftmost portion of the periphery of a drive shaft 18 that is rotatably supported by the bearing blocks in the channel 14.

The drive shaft 18 is made up of a plurality of discontinuous driving sections, with each section being supported by a plurality of bearings within respective bearing blocks and being driven by a separate drive combination of electric motor 9, mechanical transmission 11 and power connection 19, which power connection 19 is a belt extending from the pulley 12 through a suitable aperture 20 within the frame 6 to a drive pulley structure 21 on the section of the drive shaft 18. The belt 19 may be a standard V-belt, chain, chain belt, or the like. The pulley structure for the section of the drive shaft has a structure complimentary to the belt, as the structure of the pulley 12. For that portion of the periphery of the drive shaft 18 that extends to the left free of the bearing block 17, the power connection or belt does not extend beyond such peripheral portion. The shaft is preferably a hollow, cylindrical aluminum shaft having an outer cylindrical surface, and the curved sections are preferably flexible elastomeric cylindrical shafts of the same diameter with the same cylindrical outer periphery or interdigitated segments (not shown), for example.

To convert the rotary driven motion of the shaft 18, which shaft has a shaft axis 22 extending along the transporting direction, into a linear motion along the direction of the transporting path 29, at least one and preferably two and most preferably four driven wheels 23 engage the leftmost periphery or free periphery of the shaft 18. Each of these driven wheels 23 is mounted for rotation about a driven wheel axis that is non-parallel to the drive shaft axis 22 and non-perpendicular to the drive shaft axis 22, preferably being at an acute angle thereto; the angle being selected according to desired linear speed and linear force along the conveying path. When a plurality of the driven wheels 23 are provided for each wheeled vehicle to engage a single drive shaft 18, they are divided into at least two sets, with each set having their axes of rotation being within a non-vertical, non-horizontal plane that is parallel (tangent) to the drive shaft axis 22, with the planes intersecting each other. Thereby, when the drive shaft 18 rotates, the driven wheels 23 engage the drive shaft 18 to form a helical loci of engagement about the periphery of the drive shaft 18 so as to linearly power the driven wheels along the transporting path 29 in a direction of the transporting path 29 that depends upon the direction of rotation of the drive shaft 18, in a manner analogous to a worm gear or threaded-type engagement. In fact, according to broader aspects of the present invention, the drive shaft may be a worm gear and the driven wheels may be a fixed driven element or driven wheels that extend within or interengage with the worm gear or a shaft thread.

The driven wheels 23 are rotatably mounted on a carriage 24, which is preferably a formed sheet metal channel of U-shape (as seen in a plan view). A drive connector 25 comprises a U-shaped formed sheet metal piece 26 (U-shaped as viewed in the plane of FIG. 1), which as shown overlaps the opposed ends of the carriage 24. The drive connector 25 includes a bolt 27 secured in some suitable manner, for example by welding, to the carriage 24 and extending through suitable holes within the sheet metal piece 26 to have a head at its lower end and a washer and nut at its upper end. The U-shaped formed sheet metal piece 26 is rigidly connected to the wheeled vehicle 3, for example by welding or bolting, and the holes 28 therein receiving the bolt 27 are elongated in the direction towards the wheeled vehicle, to thereby provide a driving connection between the carriage 24 and the wheeled vehicle 3 in the direction of the transporting path 29 (perpendicular to the plane of FIG. 1) and providing a lost motion connection between the wheeled vehicle 3 and the carriage 24 in a lost motion direction perpendicular to the drive shaft axis 22 and extending in the horizontal plane. A bias member 30, which may be a coil spring or leaf spring (not shown) but is preferably an elastomeric compressible material such as foam rubber, extends between the U-shaped formed sheet metal piece 26 and the U-shaped carriage 24 that mounts the driven wheels 23, for biasing the driven wheels 23 into engagement with the drive shaft 18 throughout a range of the lost motion connection and in a bias direction perpendicular to the shaft axis 22 for providing sufficient engagement traction force between the driven wheels and the drive shaft to power the wheeled vehicle 3 along the transporting path 29. The bolt 27 provides a pivotal connection about a vertical pivot axis, to accommodate irregularities in engagement between the driven wheels 23 and the drive shaft 18 along the transporting path 29.

While the preferred embodiment has been shown and described in detail, the description thereof has included structural variations according to the broader aspects of the present invention. Additional structural variations include: that the power connection 19 be a chain, flexible coupling, rigid coupling, or clutch; that the carriage 24 and drive connector 25 be separate from and attached to the wheeled vehicle or a rigid part thereof, for example as described specifically; that the support surface specifically described as a factory floor may be one or more rails, a roadway, a trackway, or an overhead support surface, in whole or in part; that the bias member, in addition to being the mentioned elastomeric material or coil, or leaf spring, may be provided by a compressible gas piston cylinder arrangement, or a gravity arrangement wherein a portion of the weight of the wheeled vehicle provides a gravity bias between the drive shaft 18 and driven wheels 23 (in which case the structure including at least the driven wheels 23, drive shaft 8, channel 14, relevant portion of the frame 6, rotor 9, mechanical transmission 11, power connection 19 would be rotated 90° in the clockwise direction from the illustrated position).

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

I claim:

1. A wheeled vehicle guidance and drive system, for transporting at least one wheeled vehicle along a transporting path of a support surface, the wheeled vehicle having one or more support wheels for load carrying engagement with the support surface during movement of the wheeled vehicle along the transporting path, the system comprising:

a frame stationarily mounted with respect to the support surface and extending along the transporting path;

a drive motor mounted to said frame and having a rotational power output;

a mechanical transmission having a power input connected to said rotational power output of said drive motor and further having a rotational power output;

a drive shaft extending along the transporting path and mounted to said frame for rotation about a shaft axis that is parallel to the transporting path;

a power connection between said rotational power output of said mechanical transmission and said drive shaft for rotatably driving said drive shaft about said shaft axis;

a carriage;

at least one driven wheel rotatably mounted on said carriage for rotation about a driven wheel axis, said driven wheel axis being non-parallel and non-perpendicular to said shaft axis, and said driven wheel engaging said drive shaft with sufficient traction so as to form a helical loci of engagement about a periphery of said drive shaft during rotation of said drive shaft about said shaft axis to power said carriage along the transporting path in a direction of the transporting path dependent upon a direction of rotation of said drive shaft;

a drive connector for drivingly connecting said carriage to the wheeled vehicle in the direction of the transporting path and for providing a lost motion connection between the wheeled vehicle and said carriage in a lost motion direction perpendicular to said shaft axis; and a biasing member comprised of an elastomeric compressible material mounted between said carriage and said driven wheel and biasing said driven wheel into engagement with said drive shaft throughout a range of said lost motion connection and in a biasing direction perpendicular to said shaft axis for providing sufficient engagement traction force between said driven wheel and said drive shaft to power the wheeled vehicle along the transporting path.

2. A system according to claim 1, wherein said drive shaft is mounted to said frame by a rigid channel extending along the transporting path and being directly connected to said frame, and a plurality of bearings mounted in said rigid channel for rotatably supporting said drive shaft.

3. A system according to claim 1, wherein said drive motor is an electric motor, and wherein said power connection is a belt drive.

4. A system according to claim 1, wherein said carriage is separate from and connectable to the wheeled vehicle.

5. A system according to claim 1, wherein said drive shaft is cylindrical with a cylindrical periphery.

6. A system according to claim 5, wherein said drive shaft is mounted to said frame by a rigid channel extending along the transporting path and being directly connected to said frame, and a plurality of bearings are mounted in said rigid channel for rotatably supporting said drive shaft.

7. A system according to claim 6, wherein said drive connector includes a pivotal connection about a pivot axis perpendicular to said shaft axis and perpendicular to said bias direction.

8. A system according to claim 1, further including means separate from said driven wheel for guiding the wheeled vehicle along the transporting path to normally prevent movement of the wheeled vehicle away from said drive shaft.

9. A wheeled vehicle guidance and drive system, for transporting at least one wheeled vehicle along a transporting path of a support surface, the wheeled vehicle having one or more support wheels for load carrying engagement with the support surface during movement of the wheeled vehicle along the transporting path, the system comprising:

a frame stationarily mounted with respect to the support surface and extending along the transporting path;

a drive motor mounted to said frame and having a rotational power output;

a mechanical transmission having a power input connected to said rotational power output of said drive motor and further having a rotational power output;

a drive shaft extending along the transporting path and mounted to said frame for rotation about a shaft axis that is parallel to the transporting path;

a power connection between said rotational power output of said mechanical transmission and said drive shaft for rotatably driving said drive shaft about said shaft axis;

a carriage;

at least one driven wheel rotatably mounted on said carriage for rotation about a driven wheel axis, said driven wheel axis being non-parallel and non-perpendicular to said shaft axis, and said driven wheel engaging said drive shaft with sufficient traction so as to form a helical loci of engagement about a periphery of said drive shaft during rotation of said drive shaft about said shaft axis to power said carriage along the transporting path in a direction of the transporting path dependent upon a direction of rotation of said drive shaft;

a drive connector for drivingly connecting said carriage to the wheeled vehicle in the direction of the transporting path and for providing a lost motion connection between the wheeled vehicle and said carriage in a lost motion direction perpendicular to said shaft axis; said drive connector including a pivotal connection about a pivot access perpendicular to said shaft axis and perpendicular to said biasing direction; and a biasing member mounted between said carriage and said driven wheel and biasing said driven wheel into engagement with said drive shaft throughout a range of said lost motion connection and in a biasing direction perpendicular to said shaft axis for providing sufficient engagement traction force between said driven wheel and said drive shaft to power the wheeled vehicle along the transporting path.

* * * * *